（12）United States Patent
Acosta et al.

(10) Patent No.: US 9,424,599 B2
(45) Date of Patent: Aug. 23, 2016

(54) PROXIMITY DEVICE AND METHOD FOR BUNDLING OF PRODUCTS AND/OR SERVICES

(71) Applicant: Disney Enterprises, Inc., Burbank, CA (US)

(72) Inventors: Evan Acosta, La Crescenta, CA (US); Edward Drake, Stevenson Ranch, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 364 days.

(21) Appl. No.: 13/944,833

(22) Filed: Jul. 17, 2013

(65) Prior Publication Data

US 2014/0236770 A1    Aug. 21, 2014

Related U.S. Application Data

(60) Provisional application No. 61/766,065, filed on Feb. 18, 2013.

(51) Int. Cl.
| | |
|---|---|
| *G06Q 30/00* | (2012.01) |
| *G06Q 30/06* | (2012.01) |
| *G06Q 30/02* | (2012.01) |
| *H04B 5/02* | (2006.01) |
| *G06F 3/14* | (2006.01) |

(52) U.S. Cl.
CPC .......... *G06Q 30/0631* (2013.01); *G06F 3/1423* (2013.01); *G06F 3/1438* (2013.01); *G06Q 30/0261* (2013.01); *G06Q 30/0267* (2013.01); *G06Q 30/0269* (2013.01); *G06Q 30/0623* (2013.01); *G06Q 30/0625* (2013.01); *G06Q 30/0639* (2013.01); *H04B 5/02* (2013.01); *G09G 2370/04* (2013.01); *G09G 2370/10* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 5,986,675 | A | 11/1999 | Anderson et al. |
| 6,222,807 | B1 | 4/2001 | Min-Jae |
| 7,663,488 | B2 | 2/2010 | Kalama et al. |
| 8,010,621 | B2 | 8/2011 | Zilliacus et al. |
| 8,438,052 | B1 * | 5/2013 | Chanda .............. G06Q 30/0207 705/7.11 |

(Continued)

FOREIGN PATENT DOCUMENTS

| | | |
|---|---|---|
| CN | 101312514 | 11/2008 |
| WO | 02071285 | 9/2002 |

OTHER PUBLICATIONS www.retailcustomerexperience.com, Mar. 28, 2011. [Accessed via http://www.retailcustomerexperience.com/blogs/check-out-this-checkout-rfid-enabled-kiosks-deliver-more-than-just-a-cool-factor/].*

(Continued)

*Primary Examiner* — William Allen
*Assistant Examiner* — Allison Wood
(74) *Attorney, Agent, or Firm* — Patent Ingenuity, P.C.; Samuel K. Simpson

(57) ABSTRACT

A process stores, at a data storage device within a product and/or a product package, data associated with a bundle of products and/or services. Further, the process sends, from a proximity-based device within the product and/or the product package, the data to a mobile device when the mobile device is within a proximity to the proximity-based device.

19 Claims, 4 Drawing Sheets

(56) References Cited

U.S. PATENT DOCUMENTS

| | | |
|---|---|---|
| 2005/0111825 A1 | 5/2005 | Yun |
| 2007/0037614 A1 | 2/2007 | Rosenberg |
| 2007/0254674 A1* | 11/2007 | Pedigo .................. G01S 1/68 455/456.2 |
| 2008/0109309 A1 | 5/2008 | Landau et al. |
| 2008/0134032 A1* | 6/2008 | Pirnack ............. G06Q 30/0222 715/700 |
| 2008/0191878 A1* | 8/2008 | Abraham ........... G06Q 30/0603 340/572.1 |
| 2009/0085724 A1 | 4/2009 | Naressi et al. |
| 2009/0157449 A1* | 6/2009 | Itani ...................... G06Q 30/02 705/7.29 |
| 2010/0004988 A1* | 1/2010 | Matsuo ................. G06Q 30/02 705/14.16 |
| 2010/0010964 A1 | 1/2010 | Skowronek et al. |
| 2010/0114983 A1 | 5/2010 | Robert et al. |
| 2010/0136898 A1 | 6/2010 | Farrow |
| 2010/0161434 A1 | 6/2010 | Herwig |
| 2010/0174599 A1 | 7/2010 | Rosenblatt et al. |
| 2010/0300913 A1 | 12/2010 | Goldburt |
| 2011/0016023 A1* | 1/2011 | Zakas ................. G06Q 30/0641 705/27.1 |
| 2011/0112917 A1 | 5/2011 | Driessen |
| 2011/0119104 A1* | 5/2011 | Levine ............ G06Q 10/06315 705/7.25 |
| 2011/0140993 A1 | 6/2011 | Bess |
| 2011/0288938 A1* | 11/2011 | Cook ................ G06Q 30/0251 705/14.66 |
| 2011/0299830 A1 | 12/2011 | Sasaki |
| 2011/0320278 A1 | 12/2011 | Littman |
| 2012/0062475 A1 | 3/2012 | Locker |
| 2012/0077584 A1 | 3/2012 | Sarmenta |
| 2012/0101885 A1* | 4/2012 | Lee .................... G06Q 20/3278 705/14.23 |
| 2012/0155380 A1* | 6/2012 | Hodges ................. G06Q 30/00 370/328 |
| 2012/0208592 A1 | 8/2012 | Davis |
| 2012/0218089 A1* | 8/2012 | Hill ........................ G06F 3/016 340/407.1 |
| 2012/0220220 A1 | 8/2012 | DeLuca et al. |
| 2012/0220221 A1 | 8/2012 | Moosavi et al. |
| 2012/0224743 A1 | 9/2012 | Rodriquez et al. |
| 2012/0226573 A1* | 9/2012 | Zakas ................. G06Q 30/0207 705/26.2 |
| 2012/0245988 A1 | 9/2012 | Pace |
| 2012/0271712 A1 | 10/2012 | Katzin et al. |
| 2012/0271717 A1* | 10/2012 | Postrel .................. G06Q 30/02 705/14.58 |
| 2012/0290377 A1* | 11/2012 | Itani ................... G06Q 30/0603 705/14.23 |
| 2013/0002405 A1 | 1/2013 | Pesonen et al. |
| 2013/0006869 A1 | 1/2013 | Grab et al. |
| 2013/0106684 A1 | 5/2013 | Weast et al. |
| 2013/0181886 A1 | 7/2013 | Hill |
| 2013/0185137 A1 | 7/2013 | Shafi |
| 2013/0185147 A1* | 7/2013 | Letca ................. G06Q 30/0241 705/14.47 |
| 2013/0237147 A1 | 9/2013 | Dearman |
| 2013/0300637 A1 | 11/2013 | Smits et al. |
| 2013/0339113 A1* | 12/2013 | Junger ............... G06Q 30/0211 705/14.13 |
| 2014/0131452 A1 | 5/2014 | Testanero |

OTHER PUBLICATIONS http://www.youtube.com/watch?v=f43NGb8XRK4, Feb. 19, 2012.

* cited by examiner

PROXIMITY DEVICE AND METHOD FOR BUNDLING OF PRODUCTS AND/OR SERVICES

RELATED APPLICATIONS

This application claims priority to U.S. Provisional Patent Application Ser. No. 61/766,065, filed on Feb. 18, 2013, entitled TRANSFERENCE OF DATA TO PROVIDE CONTENT, which is hereby incorporated by reference in its entirety.

BACKGROUND

1. Field

This disclosure generally relates to the field of data transference.

2. General Background

Media products are typically placed in packages on store shelves that allow consumers to read information about the content of the media products. Examples of such media products are Blu-ray discs or DVDs with movies, television shows, video games, or the like. Consumers typically peruse different packages to find out more information about the products of potential interest. Although technology has vastly progressed, the packaging configurations for media products have mainly remained stagnant. Technological developments have simply not improved the in-store experience for many users prior to purchase.

Stores often have to compete with newer online websites that sell the same media products. Such online websites sell those media products and have utilized technological developments to learn about users and provide various incentives to users prior to the purchase of the media products. As a result of such competition, stores selling media products have faced newer challenges in maintaining the same base of customers that previously purchased media products from those stores.

SUMMARY

In one aspect, a process stores, at a data storage device within a product and/or a product package, data associated with a bundle of products and/or services. Further, the process sends, from a proximity-based device within the product and/or the product package, the data to a mobile device when the mobile device is within a proximity to the proximity-based device.

In another aspect, an apparatus comprises a data storage device within a product and/or a product package that stores data associated with a bundle of products and/or services. Further, the apparatus comprises a proximity-based device within the product and/or the product package that sends the data to a mobile device when the mobile device is within a proximity to the proximity-based device.

In yet another aspect, a system comprises a storage device that stores data associated with a bundle of products and/or services. Further, the system comprises a processor, at a server, that receives a request for data associated with the bundle of products and/or services, retrieves the data from the storage device, and generates the bundle or products and/or services.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

A data transference configuration is utilized to determine a bundle of products and/or services associated with a product and/or a product package. A user may utilize a mobile device to skew the product and/or the product package prior to an in-store purchase. As a result of skewing the product and/or the product package, the user is able to obtain a list of other products and/or services that may be purchased in a bundle along with the initial product and/or product package. For example, the user may utilize his or her smartphone to skew a DVD package in a store environment. The smartphone may then display a list of other DVD titles in a series or group with the skewed DVD package and possible incentives for purchasing the bundle, e.g., discounts, rewards, bonus products, bonus services, bonus content, coupons, special promotions, or the like.

The data transference configuration provides content producers, content providers, stores, etc., with the ability to customize the in-store experience and provide a more interesting experience for the user. As an example, the data transference configuration may be utilized to provide scavenger hunt type experiences in the store environment for users. A user may skew a product and/or a product package to obtain the scavenger hunt list. The user then has to go through the store to find the items that are on the scavenger hunt list. Upon finding each item, the user may then skew that particular item to determine the incentive that the user may receive to purchase the additional item as part of the bundle.

Further, the data transference configuration may be utilized to customize the in-store experience to a particular user. The data transference configuration may utilize user profile data to customize a bundle for a particular user. As a result, the data transference configuration provides a more interesting in-store experience for users that encourages users to spend more time perusing items in stores rather than at online websites.

The product described herein may be a media product, e.g., a Blu-ray disc, DVD, video game, or the like. Alternatively, the product may be an entertainment product that is not a media product, e.g., an action figure, a doll, or the like. Further, the product may be tickets to shows, events, or the like. The service may be performed without the purchase of a particular product.

The skewing described herein may be performed by a user placing a mobile device within proximity of the product and/or product package. The mobile device may or may not touch the product and/or product package depending upon what is necessitated by a predefined proximity.

Figure 1:
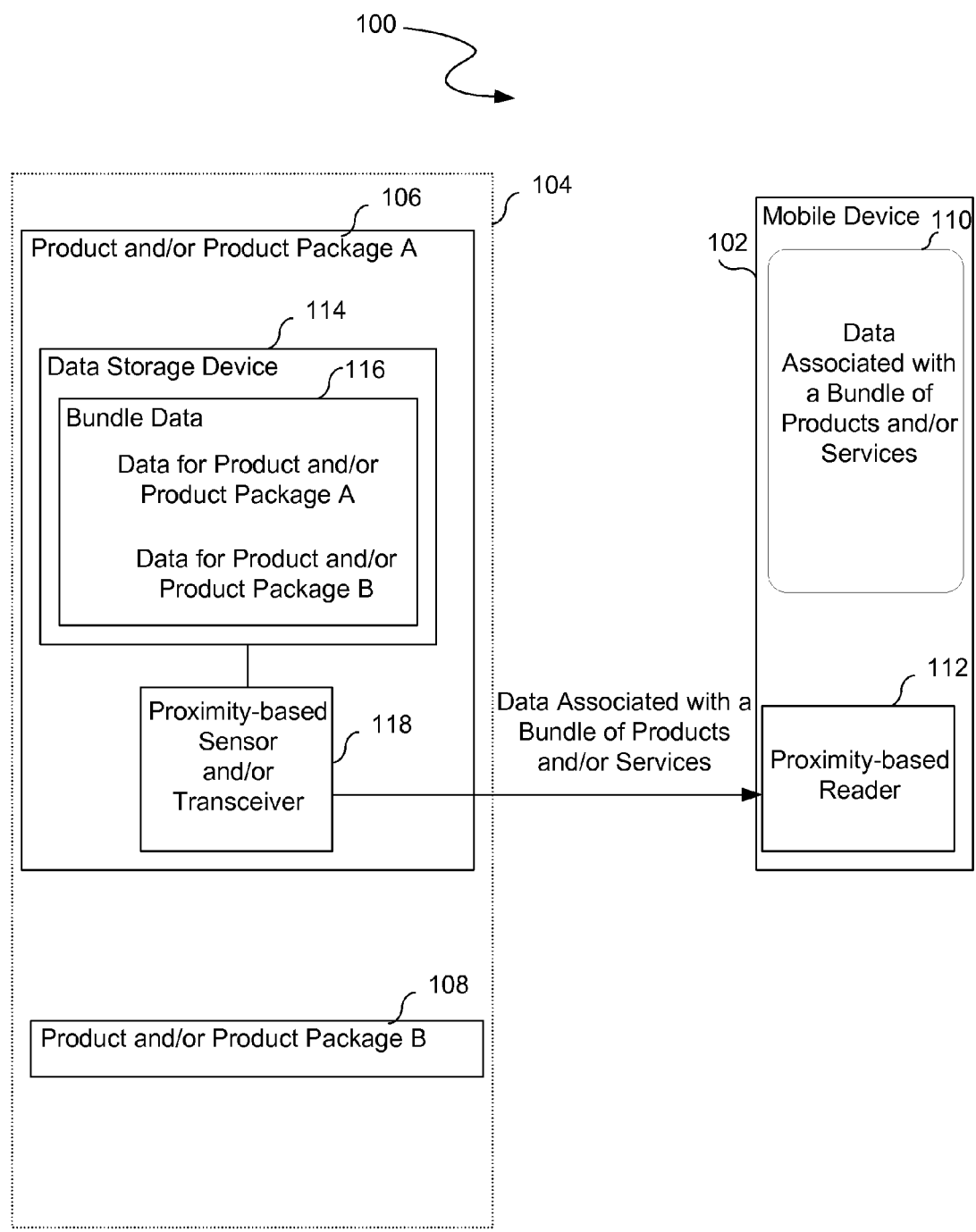
FIG. 1 illustrates a data transference configuration that allows for proximity-based detection and transfer of data for a bundle of products and/or services.

FIG. 1 illustrates a data transference configuration 100 that allows for proximity-based detection and transfer of data for a bundle of products and/or services. The data transference configuration includes a mobile device 102 and a bundle of products and/or product packages 104. The bundle of products and/or product packages 104 may or may not also includes services.

A product and/or product package may be placed on store shelves, in an amusement park, and/or in various entertainment environments. The product package 102 may have various information, e.g., pictures, text, or the like, on different portions of the product package so that the user may learn about the product prior to purchase.

As an example, the bundle of products and/or product packages 104 may include a product and/or product package A 106 and a product and/or product package B 108. For instance, the user may find the product and/or product package A 106 in a store environment. The user may utilize a mobile device 102 to interact with the product and/or product package A 106, i.e., skew the product and/or product package A 106 to obtain data about the available bundle 104. The mobile device 102 has a display 110 and a proximity-based reader (or transceiver) 112. The mobile device 102 is a device such as a smartphone, tablet, laptop, wearable computing device, or the like. The display 110 displays data such as text, video, or the like on the mobile device 102. The display 110 may be a display that is integrated within the mobile device 102, e.g., a smartphone display. Alternatively, the display 110 may be a display that is operably connected to the mobile device, e.g., an LED monitor, an LCD monitor, or the like.

Further, the product and/or product package A 106 has a data storage device 114 that stores bundle data 116 for the available bundle 104. The product and/or product package A 106 also has a proximity-based sensor and/or transceiver 118, e.g., RFID chip, RFID tag, Near Field Communication ("NFC") chip, NFC tag, Bluetooth, or the like. The proximity-based sensor and/or transceiver 118 may establish radio or other communication with the proximity-based reader 112 of the mobile device 102 based upon one or more standards, e.g., NFC standards.

For example, the proximity-based reader 112 may be a receiver that detects the presence of the proximity-based sensor and/or transceiver 118. Upon detection, the mobile device 102 may receive the bundle data 116 when in proximity to the proximity-based sensor and/or transceiver 118 of the product and/or the product package A 106. The reading may be performed with or without connecting to a network such as the Internet to access more content.

In one aspect, the bundle data 116 is stored directly at the data storage device 114 so that the mobile device 102 does not have to connect to a network. Accordingly, the mobile device 102 may obtain the bundle data 116 directly. The user may then utilize the bundle data 116 to determine the available products in the bundle 104 and then search the store for those products. In one aspect, the bundle incentives are provided to the user along with the bundle items. In another aspect, the bundle incentives are provided to the user only after the user finds each other item, e.g., the product and/or product package B 108, and skews that particular product.

In one aspect, the bundle incentives are static, e.g., predetermined. For example, the bundle incentives are stored in a fixed fashion on the data storage device 114 and are not customized for different users. In another aspect, the bundle incentives are dynamically updated for different users, different stores, different regions, or the like.

Figure 2:
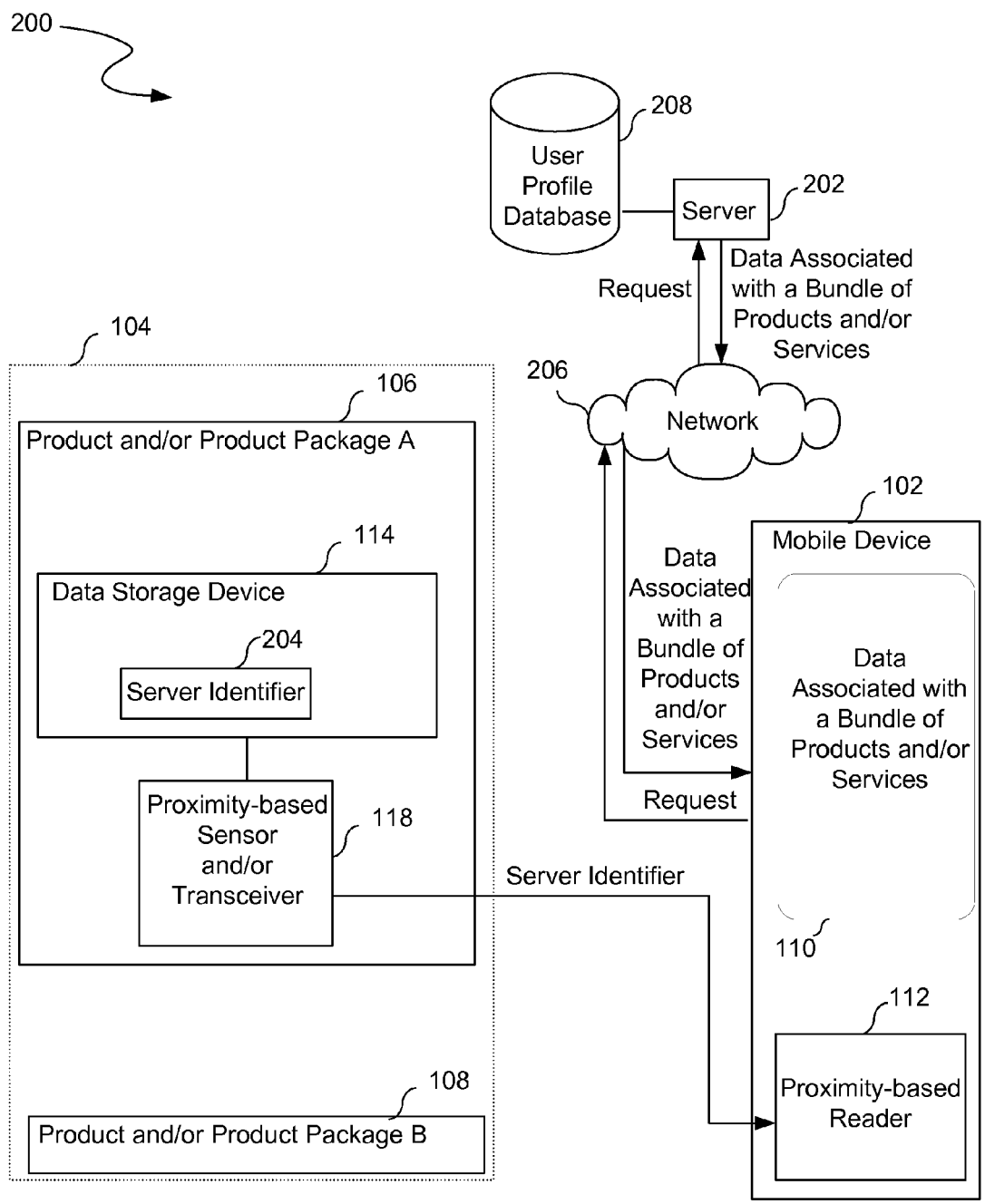
FIG. 2 illustrates a server-based data transference configuration that allows for proximity-based detection and transfer of data for a bundle of products and/or services.

FIG. 2 illustrates a server-based data transference configuration 200 that allows for proximity-based detection and transfer of data for a bundle of products and/or services. A server 202 is identified by a server identifier 204, e.g., a Uniform Resource Locator ("URL"), Internet Protocol ("IP") address, or the like, stored by the data storage device 114 in the product and/or product package A 106. The proximity-based reader 112 of the mobile device 102 reads the server identifier 204 from the proximity-based sensor and/or transceiver 118 upon being within proximity of the proximity-based sensor and/or transceiver 118. The mobile device 102 then requests the data associated with the bundle from the server 202 through a network 206 as identified by the server identifier 204.

In one aspect, the server 202 is in operable communication, e.g., wireline or wireless, with a user profile database 208. The mobile device 102 may also send a user identifier to the server 202. The server 202 may then determine user preferences for the particular user and utilize those preferences to generate a customized bundle for the particular user. The user profile database 208 may store previous purchase information, demographic information, and/or the like that may help the server 202 in automatically generating a customized bundle that is of interest to a particular user. Further, the incentives such as rewards may be provided to the particular user. For example, a user that has purchased more products from a particular store may receive a larger discount than a user that has purchased less products from that particular store.

Figure 3:
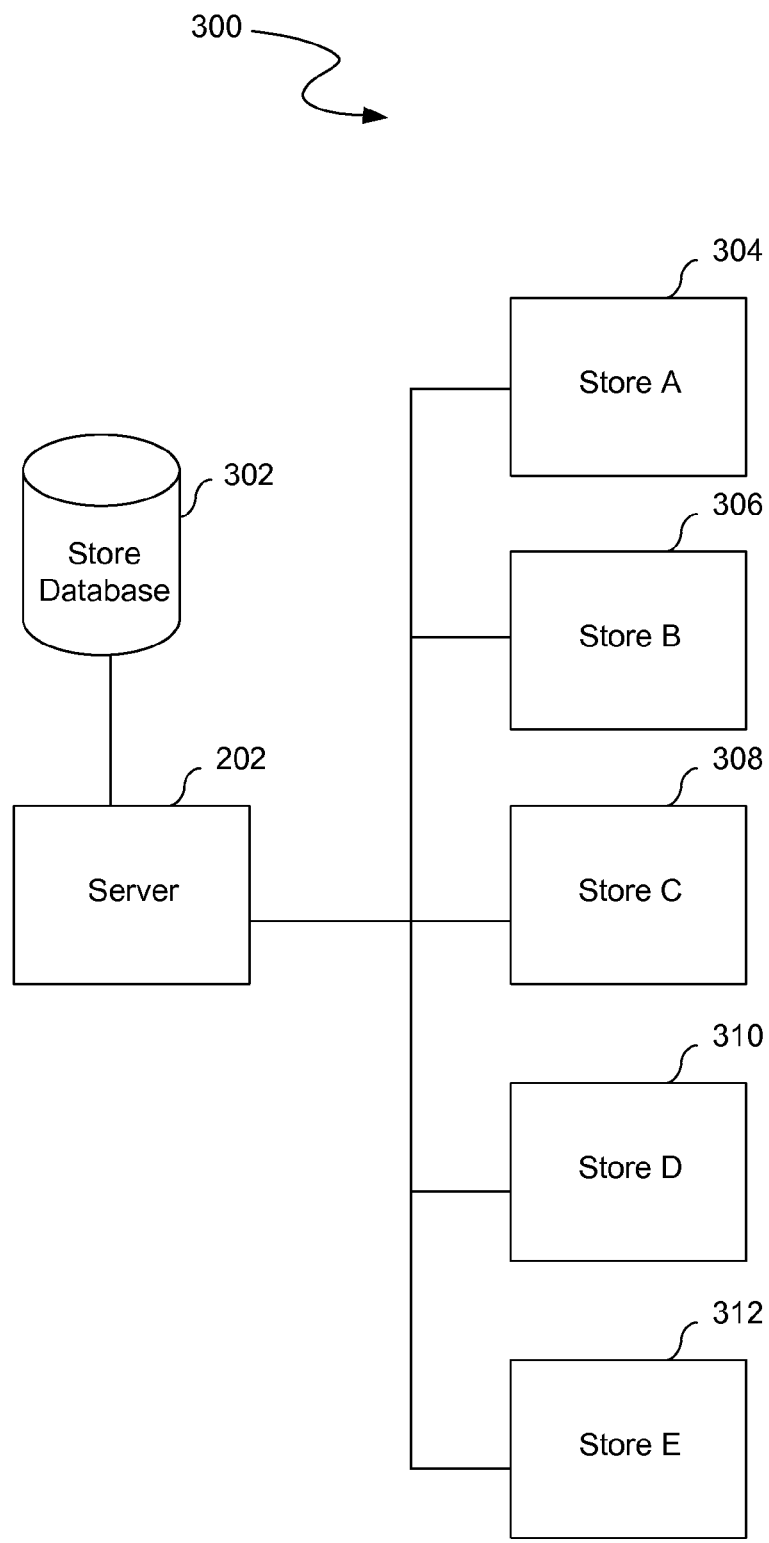
FIG. 3 illustrates a server-based data transference configuration that communicates with various store locations to generate the bundle or products and/or services.

FIG. 3 illustrates a server-based data transference configuration 300 that communicates with various store locations to generate the bundle of products and/or services. The server 202 may be in operable communication with a store database 302. The store database 302 may store various information about stores selling products and/or services, e.g., availability of products and/or services, sales information, demographic information, or the like. The server 202 may then retrieve information from the store database 302 to generate bundles for particular stores, e.g., store A 304, store B 306, store C 308, store D 310, and store E 312. For example, the server 202 may generate a different bundle for the store A 304 than the store B 306 as different products and/or product packages may be available at such stores.

When the server 202 receives a request from a user for bundle data as illustrated in FIG. 2, the server 202 may also receive the store location data of where that particular user is located. For example, the mobile device 102 may send GPS or other geolocation data along with the request for the bundle data so that the server 202 may retrieve the corresponding store information from the store database 302. As a result, the server 202 is able to dynamically generate bundles based upon particular users and particular stores.

Figure 4:
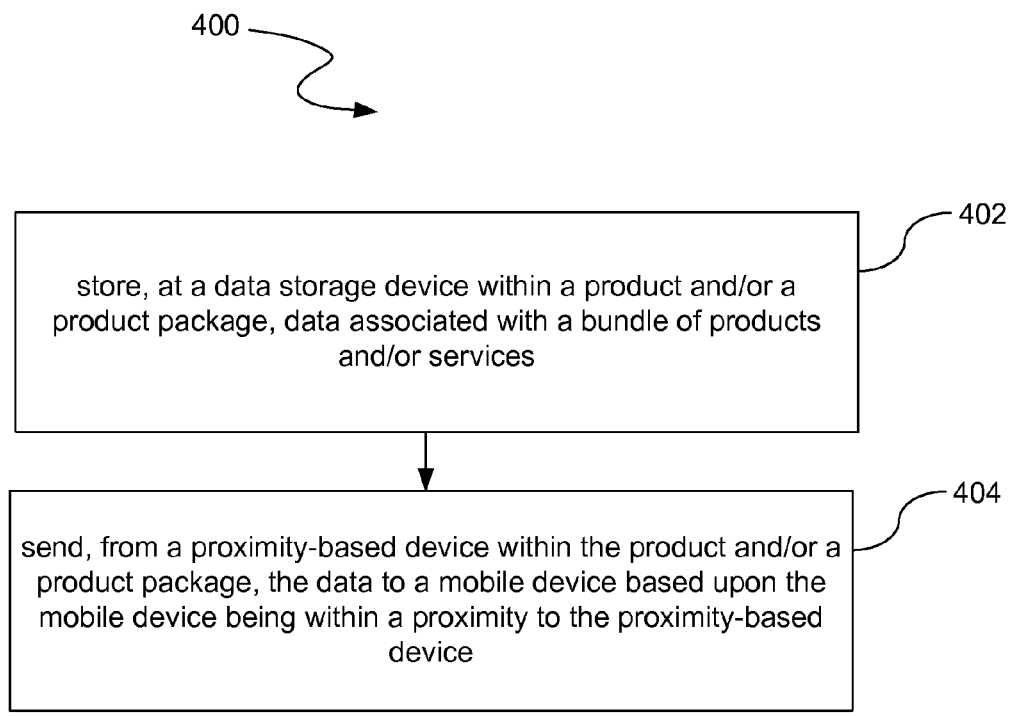
FIG. 4 illustrates a process that provides data for a bundle of products and/or product packages.

FIG. 4 illustrates a process 400 that provides data for a bundle of products and/or product packages. At a process block 402, the process 400 stores, at a data storage device within a product and/or a product package, data associated with a bundle of products and/or services. Further, at a process block 404, the process 400 sends, from a proximity-based device within the product and/or the product package, the data to a mobile device when the mobile device is within a proximity to the proximity-based device.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
   storing, at a data storage device within a product and/or a product package associated with the product, a server identifier identifying a server that dynamically generates a bundle of products and/or services comprising the product and one or more products and/or services that are distinct from the product based upon a user identifier that is associated with a user profile, the bundle of products being associated with one or more incentives that are dynamically updated based upon the user profile;
   detecting, with a proximity-based sensor within the product and/or the product package, presence of a proximity-based reader within a proximity to the proximity-based sensor, the proximity-based reader being within a mobile device; and
   activating, with the proximity-based sensor, transmission of the data to the mobile device based upon the detection.

2. The method of claim 1, wherein the bundle of product and/or services is predetermined.

3. The method of claim 1, wherein the bundle of product and/or services is dynamically generated.

4. The method of claim 1, wherein the data includes a server identifier that the mobile device utilizes to request a list of the bundle of products and/or services from a server associated with the server identifier.

5. The method of claim 1, wherein a server composes the list of the bundle of products and/or services based upon the product and/or the product package.

6. The method of claim 1, wherein a server composes the list of the bundle of products and/or services based upon the product and/or the product package and a user profile.

7. The method of claim 1, wherein a server composes the list of the bundle of products and/or services based upon the product and/or the product package and a store profile.

8. The method of claim 1, wherein a server composes the list of the bundle of products and/or services based upon availability of the bundle of products and/or services.

9. The method of claim 1, wherein the mobile device comprises a proximity-based receiver.

10. The method of claim 9, wherein the proximity-based receiver is a Near Field Communication receiver.

11. The method of claim 1, wherein the proximity is predefined.

12. The method of claim 1, wherein the bundle of product and/or services includes an incentive particular to the bundle of product and/or services.

13. The method of claim 12, wherein the incentive is selected from the group consisting of a discount, a reward, a bonus feature, a bonus product, a bonus service, and bonus content.

14. An apparatus comprising:
   a data storage device within a product and/or a product package associated with the product that stores a server identifier identifying a server that dynamically generates a bundle of products and/or services comprising the product and one or more products and/or services that are distinct from the product based upon a user identifier that is associated with a user profile, the bundle of products being associated with one or more incentives that are dynamically updated based upon the user profile; and
   a proximity-based sensor within the product and/or the product package that detects presence of a proximity-based reader within a proximity to the proximity-based sensor and activates transmission of the data to the mobile device based upon the detection, the proximity-based reader being within a mobile device.

15. The apparatus of claim 14, wherein the bundle of product and/or services is predetermined.

16. The apparatus of claim 14, wherein the bundle of product and/or services is dynamically generated.

17. The apparatus of claim 14, wherein the data includes a server identifier that the mobile device utilizes to request a list of the bundle of products and/or services from a server associated with the server identifier.

18. The apparatus of claim 14, wherein a server composes the list of the bundle of products and/or services based upon the product and/or the product package.

19. The apparatus of claim 14, wherein a server composes the list of the bundle of products and/or services based upon the product and/or the product package and a user profile.

* * * * *